(12) United States Patent
Sharma

(10) Patent No.: US 9,098,148 B2
(45) Date of Patent: *Aug. 4, 2015

(54) DETECTING AND TRACKING TOUCH ON AN ILLUMINATED SURFACE USING A MACHINE LEARNING CLASSIFIER

(71) Applicant: Texas Instruments Incorporated, Dallas, TX (US)

(72) Inventor: Vinay Sharma, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 237 days.

This patent is subject to a terminal disclaimer.

(21) Appl. No.: 13/828,736

(22) Filed: Mar. 24, 2013

(65) Prior Publication Data
US 2013/0241890 A1 Sep. 19, 2013

Related U.S. Application Data

(60) Provisional application No. 61/610,867, filed on Mar. 14, 2012.

(51) Int. Cl.
*G06F 3/042* (2006.01)
*G06F 3/041* (2006.01)

(52) U.S. Cl.
CPC ............ *G06F 3/0426* (2013.01); *G06F 3/0416* (2013.01); *G06F 3/0425* (2013.01); *G06F 3/041* (2013.01)

(58) Field of Classification Search
CPC ............... G06F 3/042; G06F 3/0425–3/0426; G06F 3/0416; G06F 3/0421; G06F 3/0423; G06F 3/0428; G06F 3/03547; G06F 3/0412; G06F 3/0414; G06F 3/047; G06F 2203/04109; G06F 2203/041

USPC .................................................. 345/173–179
See application file for complete search history.

(56) References Cited

U.S. PATENT DOCUMENTS

| 5,107,253 A | 4/1992 | Meadows |
| 2005/0168448 A1 | 8/2005 | Simpson |

(Continued)

OTHER PUBLICATIONS

James Munkres, "Algorithms for the Assignment and Transportation Problems", Journal of the Society for Industrial and Applied Mathematics, vol. 5, No. 1, Mar. 1957, pp. 32-38, Society for Industrial and Applied Mathematics, Philadelphia, PA.

(Continued)

*Primary Examiner* — Lun-Yi Lao
*Assistant Examiner* — Jarurat Suteerawongsa
(74) *Attorney, Agent, or Firm* — Mirna Abyad; Frank D. Cimino

(57) ABSTRACT

A method for touch detection that is performed by a touch processor in an optical touch detection system is provided. The method includes receiving an image of an illuminated surface in the optical touch detection system, wherein the image is captured by a camera in the optical touch detection system, identifying a set of candidate touch locations in the image, classifying the candidate touch locations in the set of candidate touch locations to generate a set of validated candidate touch locations, wherein classifying the candidate touch locations includes using a machine learning classifier to classify each candidate touch location as valid or invalid, wherein the machine learning classifier is trained to classify a candidate touch location based on a combination of features of the candidate touch location, and outputting a set of final touch locations.

18 Claims, 5 Drawing Sheets

(56) References Cited

U.S. PATENT DOCUMENTS

| | | | |
|---|---|---|---|
| 2008/0158185 A1* | 7/2008 | Westerman | 345/173 |
| 2010/0225617 A1* | 9/2010 | Yoshimoto et al. | 345/175 |
| 2012/0062474 A1* | 3/2012 | Weishaupt et al. | 345/173 |
| 2013/0241889 A1* | 9/2013 | Sharma | 345/175 |

OTHER PUBLICATIONS

Timo Ojala et al, "Multiresolution Gray-Scale and Rotation Invariant Texture Classification with Local Binary Patterns", IEEE Transactions on Pattern Analysis and Machine Intelligence, vol. 24, No. 7, Jul. 2002, pp. 971-987.

P.C. Mahalanobis, "On the Generalized Distance in Statistics", Proceedings National Institute of Science, India, vol. 2, No. 1, Apr. 16, 1936, pp. 49-55, Calcutta, India.

Geoff Walker and Mark Fihn, "Beneath the Surface", Information Display, Mar. 2010, vol. 26, No. 3, pp. 32-34, Society for Information Display (SID).

Geoff Walker, "Camera-Based Optical Touch Technology", Information Display, Mar. 2011, vol. 27, No. 3, pp. 30-34, Society for Information Display (SID).

Ian Maxwell, "An Overview of Optical-Touch Technologies", Information Display, Dec. 2007, vol. 23, No. 12, pp. 26-30, Society for Information Display (SID).

* cited by examiner

DETECTING AND TRACKING TOUCH ON AN ILLUMINATED SURFACE USING A MACHINE LEARNING CLASSIFIER

CROSS-REFERENCE TO RELATED APPLICATIONS

This application claims benefit of U.S. Provisional Patent Application Ser. No. 61/610,867, filed Mar. 14, 2012, which is incorporated herein by reference in its entirety. This application is related to co-pending U.S. patent application Ser. No. 13/828,292, filed Mar. 14, 2013, co-pending U.S. patent application Ser. No. 13/828,641, filed Mar. 14, 2013, co-pending U.S. patent application Ser. No. 13/828,404, filed Mar. 14, 2013, and co-pending U.S. patent application Ser. No. 13/828,526, filed Mar. 14, 2013, which are incorporated by reference herein in their entirety.

BACKGROUND OF THE INVENTION

1. Field of the Invention

Embodiments of the present invention generally relate to detecting and tracking touch on an illuminated surface.

2. Description of the Related Art

Touch displays are used in many consumer applications (e.g., smart phones, computer displays, medical imaging devices, automotive control displays, etc.) to provide an intuitive user interface. The touch detection technology used in such displays includes electrical capacitance detection, electrical resistance detection, and optical detection. For optical touch detection, one or more imaging sensors and one or more light sources (e.g., one or more infrared cameras and infrared light-emitting diodes (LEDs)) may be used to capture images of a touch surface. The captured images are processed to detect objects (e.g., a finger or a stylus) touching or near the surface.

Examples of such optical touch detection systems include an infrared (IR) rear-projection touch system, an IR curtain touch system, and a frustrated total internal reflection system. A typical IR rear-projection touch system includes a projector, a display screen (also referred to as a touch screen or touch surface), infra-red emitters (e.g., LEDs), one or more infra-red sensors (e.g., cameras), and a processing engine. The IR emitters flood the rear surface of the display screen with IR light. Some portion of the IR light rays passes through (refracts) the display screen while the remaining light bounces off (reflects) the screen. The IR camera or cameras create an image from the IR light that makes it back to the sensor. When an object touches the screen, it reflects some of the IR light rays emerging from the screen back through the screen surface toward the IR sensor. The images captured by the camera are analyzed to detect the presence and location (x, y coordinates) of the touch.

In an IR curtain touch system, a curtain of IR light is cast over the touch surface such that the plane of the IR curtain is close to and parallel to the surface while not actually touching the surface. When an object touches the surface, the object breaks the light curtain and IR light reflects off the object. Some of this reflected light is captured by one or more IR cameras located on the same side of the touch surface as the light curtain. The IR camera or cameras create an image from the IR light that makes it back to the sensor. The images captured by the camera are analyzed to detect the presence and location (x, y coordinates) of the touch.

In a frustrated total internal reflection system, one or more IR light sources flood the inside of the screen with infrared light based on the principle of total internal reflection. This light undergoes complete reflections off either surface of the screen and remains trapped inside the material of the screen (usually, acrylic). When a user touches the screen, some of the light rays at the point of contact, instead of being fully reflected, pass through the surface and reflect off the contact material (usually, the user's skin). This frustrated light is then scattered down, away from the contact point, through the screen, and toward an IR camera, which creates an image from the IR light impinging a sensor or sensors in the camera. These light rays create a bright spot on the otherwise dark image. The images thus captured by the camera are analyzed to detect the presence and location of the touch point. In a frustrated total internal reflection system, typically the projector and IR camera are placed behind the screen, opposite from the side from which the user interacts with the screen. However, it is also feasible to place the projector in the front of the screen, on the same side where the user interaction occurs.

SUMMARY

Embodiments of the present invention relate to methods, apparatus, and computer readable media for detecting and tracking touch. In one aspect, a method for touch detection that is performed by a touch processor in an optical touch detection system is provided. The method includes receiving an image of an illuminated surface in the optical touch detection system, wherein the image is captured by a camera in the optical touch detection system, identifying a set of candidate touch locations in the image, classifying the candidate touch locations in the set of candidate touch locations to generate a set of validated candidate touch locations, wherein classifying the candidate touch locations includes using a machine learning classifier to classify each candidate touch location as valid or invalid, wherein the machine learning classifier is trained to classify a candidate touch location based on a combination of features of the candidate touch location, and outputting a set of final touch locations.

In one aspect, an optical touch detection system configured for touch detection is provided that includes an illuminated surface, a camera positioned to capture images of the illuminated surface, means for receiving an image of the illuminated surface captured by the camera, means for identifying a set of candidate touch locations in the image, means for classifying the candidate touch locations in the set of candidate touch locations to generate a set of validated candidate touch locations, wherein classifying the candidate touch locations includes using a machine learning classifier to classify each candidate touch location as valid or invalid, wherein the machine learning classifier is trained to classify a candidate touch location based on a combination of features of the candidate touch location, and means for outputting a set of final touch locations.

In one aspect, a computer readable medium storing software instructions that, when executed by a touch processor in an optical touch detection system, cause the optical touch detection system to perform a method for touch detection is provided. The method includes receiving an image of an illuminated surface in the optical touch detection system, wherein the image is captured by a camera in the optical touch detection system, identifying a set of candidate touch locations in the image, classifying the candidate touch locations in the set of candidate touch locations to generate a set of validated candidate touch locations, wherein classifying the candidate touch locations includes using a machine learning classifier to classify each candidate touch location as valid or invalid, wherein the machine learning classifier is trained to classify a candidate touch location based on a combination of features of the candidate touch location, and outputting a set of final touch locations.

BRIEF DESCRIPTION OF THE DRAWINGS

Particular embodiments will now be described, by way of example only, and with reference to the accompanying drawings.

DETAILED DESCRIPTION OF EMBODIMENTS OF THE INVENTION

Figure 1:
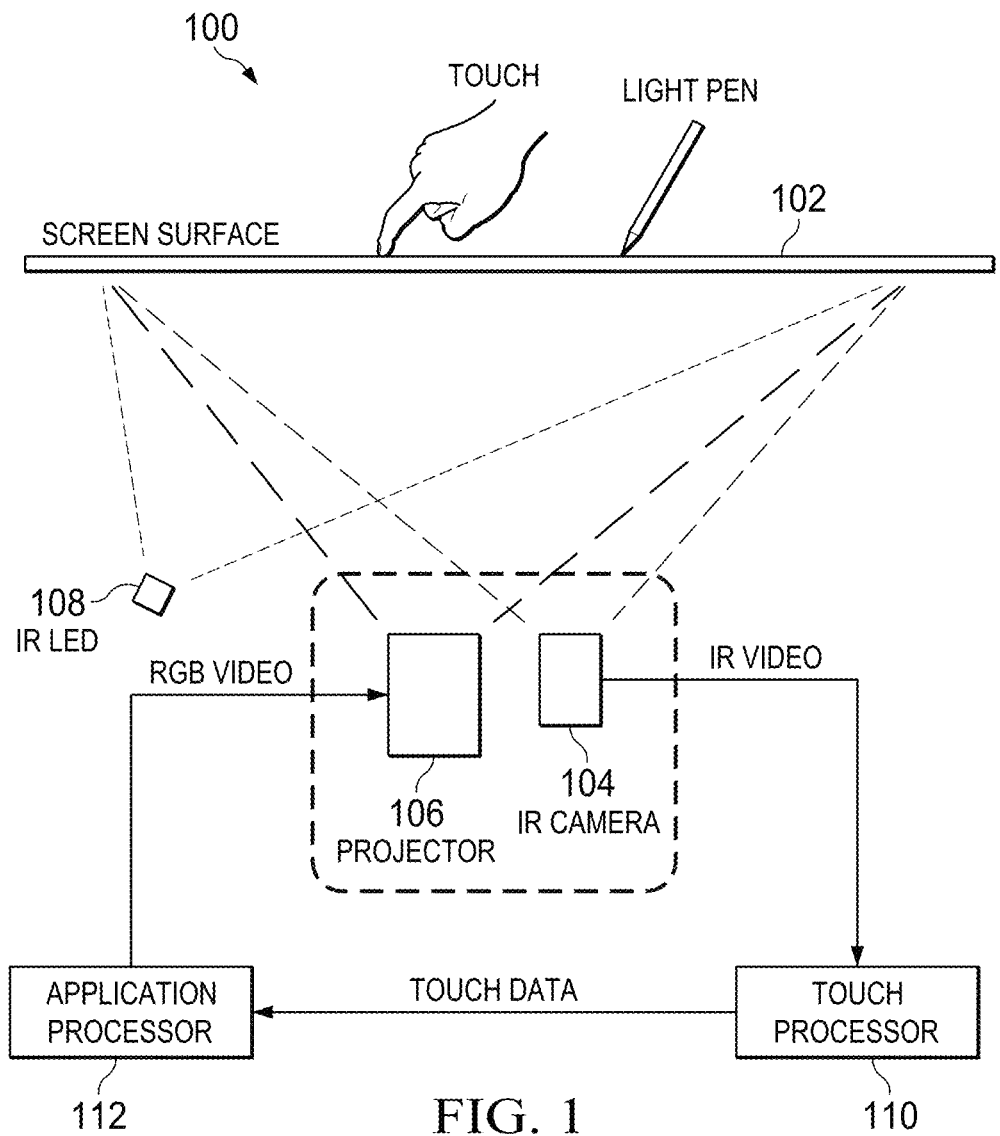
FIG. 1 is a high level block diagram of an example optical touch detection system.

Specific embodiments of the invention will now be described in detail with reference to the accompanying figures. Like elements in the various figures are denoted by like reference numerals for consistency.

Embodiments of the invention provide for detection and localization of an object (e.g., a finger or stylus) touching an illuminated surface. Computer vision analysis techniques are applied to the analysis of images of the illuminated surface captured by a camera to detect valid touch events as the events occur. Coordinates of identified touch locations at each frame are provided for further processing in an application. Further, in some embodiments, touch locations are tracked over time for touch activated applications that need to know the trajectory of a touch.

FIG. 1 is a high level block diagram of an example optical touch detection system 100. The optical touch detection system 100 includes a screen 102, an IR camera 104, a projector 106, one or more IR LEDs 108, a touch processor 110, and an application processor 112. The projector 106 is placed behind the screen 102 and projects RGB video from the application processor 112 on the rear surface of the screen 102. The projector 106 may be any suitable projection system, such as, for example, a digital light processing (DLP) projection system, a liquid crystal display (LCD) projection system, or a liquid crystal on silicon (LCOS) projection system.

The IR light emitting diodes 108 are placed behind the screen 102 and arranged to flood IR light through the rear surface of the screen 102, with some IR light reflecting back from the screen 102. The IR camera 104 is placed behind the screen and is arranged to capture a video of IR images formed from the IR light impinging on the sensor. When an object, e.g., a finger, pen, etc., touches the surface of the screen 102, the IR images (frames) in the video change in the location of the touch as the IR light transmitting through the screen 102 is reflected back at the touch location and captured by the camera sensor. Further, the images change as objects an object, such as a user's hand, moves in front of the screen 102 within sufficient proximity to cause IR light reflections.

The touch processor 110 receives IR video from the IR camera 104 and processes each frame to identify touch data such as touch locations, gestures, touch trajectory, etc. The operation of the touch processor 110 to determine touch locations and to perform touch tracking is described in more detail below in reference to FIG. 2.

The application processor 112 hosts applications available to a user of the optical touch detection system 100 and provides the RGB video, e.g., a touch activated user interface, which is to be displayed on the screen 102 by the projector 106. The application processor 112 receives touch data from the touch processor 110 and uses the touch data to determine what, if any, actions are to be performed responsive to the touch data. For example, if the touch data indicates that a user has touched an icon displayed on the screen 102, the application processor 112 may execute an application associated with that icon, which in turn will cause the application processor 112 to change the content of the RGB video being displayed in some application specific way.

Figure 2:
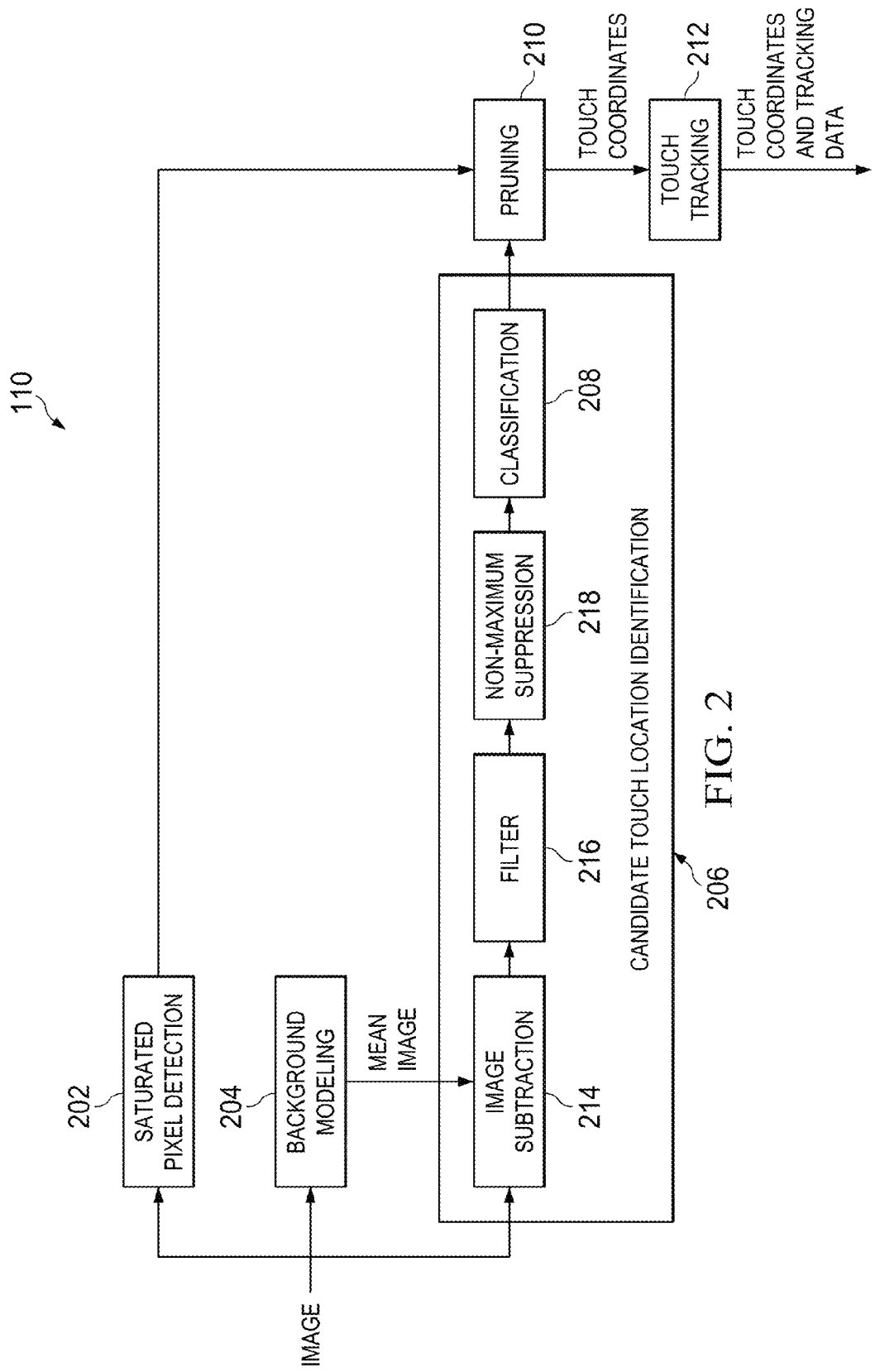
FIG. 2 is a block diagram illustrating touch detection in the touch processor of FIG. 1.

FIG. 2 is block diagram illustrating touch detection and touch tracking performed by the touch processor 110 of FIG. 1. The illustrated components are used to process each frame of the IR video captured by the IR camera 104. Note that the frames may be pre-processed prior to the application of the touch detection and tracking. Such pre-processing may include, for example, image smoothing, de-noising, combining pairs of images, etc. The components of the touch processor 110 utilized for touch detection and localization include a saturated pixel detection component 202, a background modeling component 204, a candidate touch location identification component 206, and a pruning component 210. The touch processor 110 also includes a touch tracking component 212.

The saturated pixel detection component 202 operates to identify (segment) saturated (or near-saturated) pixels in the input image. Depending on the structure and material of the screen 102, an image of the reflected IR light may contain regions of bright specular reflections that appear as saturated (or near-saturated) pixels in the image. If a touch aligns with pixels that are highly saturated, there is no differential modulation of the reflected IR light. If these saturated image regions were completely static, the background modeling process would adequately handle these pixels. However, touch interaction with the screen often causes the screen to flex, which causes small movements in the image location of these specularities. Other factors such as extreme ambient temperature can also cause the screen to bend, thereby causing a drift in the location of the specular reflections. When the specularity moves, it appears as a bright spot in the mean subtracted image, and can result in a false positive. To handle potential false positives, it is important to identify regions of high specularity.

The saturated pixel detection component 202 may determine the locations of highly saturated pixels using any suitable technique. In one embodiment, the saturated pixel detection component 202 applies a high saturation threshold, $T_s$, to the image and identifies all pixels that are above this threshold as being "saturated". The intensity of a truly saturated pixel is the maximum value permissible by the bit-depth of the captured image. For instance, in an 8-bit image, saturated pixels would have a value of 255. The intensity of a truly saturated pixel as per the bit representation of the pixels in an image determines the upper bound on $T_s$. To determine the lower bound, one approach is to empirically determine the maximum expected intensity P from a valid touch event. The threshold $T_s$ is then chosen such that $P < T_s \leq 255$, assuming an 8-bit pixel representation. The exact value of the threshold $T_s$ may be determined by empirical evaluation of image data during a training phase. The saturated pixel detection component 202 may save the pixels that meet the specified criteria in a suitable data structure S, e.g., a list or an array.

The background modeling component 204 maintains an image of the neutral (no touch) state of the screen 102 surface to capture any non-uniformities and artifacts that might exist in the IR light reflecting from the screen 102 when no object is touching the screen. The background modeling component 204 may maintain this background image, also referred to as a mean image, using any suitable technique for background modeling. In one embodiment, the background modeling component 204 computes the background image $I_B$ using a technique in which the lowest intensity value at each pixel location is preserved as the background image. As the IR camera 104 captures images, the intensity at each pixel of the input image is compared against the intensity of the corresponding pixel in the background image. If the input pixel intensity is lower than the background pixel intensity, the value of the background pixel in the background image is changed to be that of the input pixel; if not, the value of the background pixel is not changed.

In one embodiment, the background modeling component 204 builds a single Gaussian model to capture the background image. That is, the background modeling component 204 maintains the mean and variance values for each pixel of the input image. For each input frame, the background modeling component 204 compares the Mahalanobis distance of the input image to the mean image. If the Mahalanobis distance of a pixel is greater than a threshold, the pixel is flagged as a candidate foreground pixel. For each pixel that does not pass the threshold, the mean value and the variance value are updated using an exponentially weighted update rule. In such embodiments, the background image $I_B$ corresponds to the mean value of the each pixel. Additionally, a list, F, of pixels coordinates that correspond to the foreground for each input image is produced. The Mahalanobis distance is described in Mahalanobis, P., "On the Generalised Distance in Statistics," Proceedings of the National Institute of Sciences of India, Vol. 2, No. 1, pp. 49-55, Apr. 16, 1936. The threshold used to separate foreground and background pixels may have any suitable value and may be determined empirically.

The candidate touch location identification component 206 identifies potential, i.e., candidate, touch locations, if any, in the image. The candidate touch location identification component 206 includes an image subtraction component 214, a filter component 216, a non-maximum suppression component 218, and a classification component 208. For each image (frame), the image subtraction component 214 subtracts the background (mean) image maintained by the background modeling component 204 from the input image. This subtraction compensates for background artifacts and reduces their impact on the touch detection processing that follows. The subtraction of the background image from the input image to generate a mean-subtracted image may be performed as per $$I_2 = I - I_B$$

$$I_2(x,y) = 0, \text{ if } I_2(x,y) < 0$$

where I is the input image, $I_B$ is the background image, and $I_2$ is the resulting image.

Figure 3A:
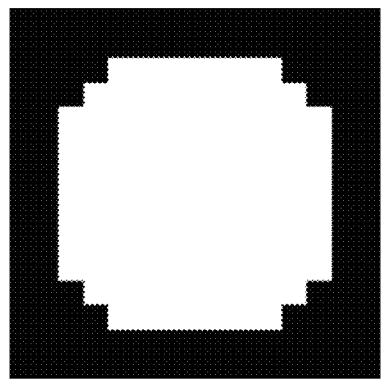
FIGS. 3A-3C are example filters.
Figure 3B:
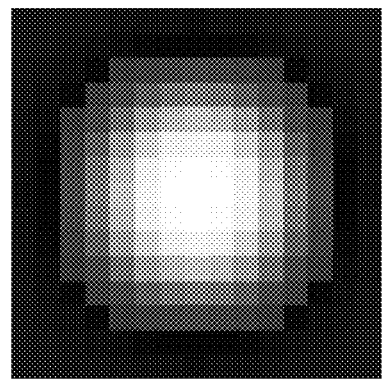
Figure 3C:
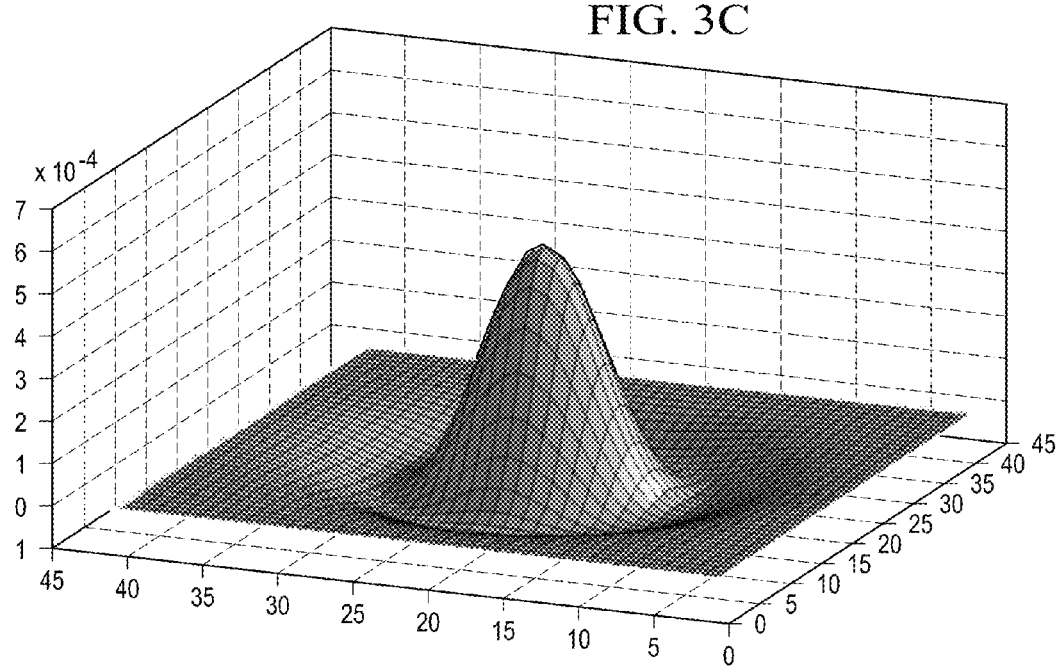

The filter component 216 convolves the mean-subtracted image $I_2$ with a specially designed filter to generate the filtered image $I_f$. The filter is designed to generate a high response at pixels that are at the center of a local region of high intensity surrounded by lower intensity pixels. FIGS. 3A-3C show examples of such filters. The filter in FIG. 2A has +1 and −1 as the coefficients. The filter in FIG. 3B has Gaussian distributed weights that emphasize the center regions more than the edges. The filter in FIG. 3C is a Laplacian-of-Gaussian filter with large coefficients toward the center and smaller coefficients of the opposite sign towards the periphery. The filters are normalized to ensure that the sum of the coefficients equals zero.

The size of the filter region with positive coefficients corresponds to the expected size of a touch interaction, e.g., the expected size of a fingertip. In some embodiments, the filter component 216 applies a single filter, e.g., a filter such as those illustrated in FIGS. 3A and 3B. In some embodiments, to better accommodate different finger touch sizes, the filter component 216 includes a bank of filters of different sizes (or scales) and convolves the image with each filter. The filter which best matches the scale of the touch will generate the highest response. In order to compare the filter responses of filters of different scales, the filter definition is also scale normalized. In some such embodiments, a scale-normalized Laplacian-of-Gaussian filter such as the example shown in FIG. 3C is used.

The non-maximum suppression component 218 identifies local maxima in the combined filter response image from the filter component 216 using a non-maximum suppression technique. For example, each pixel may be compared to each pixel in a local neighborhood. If a pixel has a value greater than all of the neighboring pixels in the local neighborhood, that pixel is a local maximum, and its value and coordinates are preserved. Any suitable size may be used for the pixel neighborhood. The size is implementation dependent and may be determined empirically. The identified local maxima are candidate touch locations.

If the filter component 216 uses a filter bank of multiple scales, the non-maximum suppression is applied in both space (2D) and scale to find the locally maximal response. In some embodiments, a 9×9 neighborhood in space is considered, and, in scale, the adjacent neighbors are considered, i.e., the neighborhood is of size 9×9×3. If the filter component 216 uses a filter of a single scale, the non-maximum suppression is applied only in 2D space. In some such embodiments, a 9×9 neighborhood is considered.

The classification component 208 operates to determine where or not the local maxima, i.e., the initial candidate touch locations, identified by the non-maximum suppression component 218 are valid candidate touch locations. In some embodiments, the classification component 208 compares each local maxima against a detection threshold. The pixels that pass this threshold are considered to be valid candidate touch pixels. Any suitable threshold value may be used. The value of the threshold may be determined empirically based on analyzing training data in which the filter response values from known touch and non-touch locations are captured and compared.

In some embodiments, to compensate for non-uniformity in the overall brightness of the infrared light over an image, the detection threshold is spatially varying. As previously mentioned, depending on a number of factors such as the shape of the screen, the relative position of the IR LEDs and the IR camera, etc., the IR light from the screen may be considerably non-uniform in pixel intensity. Thus a touch occurring at different regions of the screen may result in different filter response values. If these differences are large, a single threshold may not be sufficient to capture all valid candidate touch locations. Accordingly, in some such embodiments, each pixel location may be assigned a threshold that is a function of the pixel's brightness when touched. This spatially varying threshold may be determined, for example, via a calibration phase where a user touches the screen at a number of locations, and the touch signal strength at these locations is captured and interpolated in 2D over all the pixels of the image. The threshold at a pixel can then be set at some fraction of the interpolated touch signal strength at that pixel. Alternatively, in some such embodiments, rather than having a per-pixel threshold, the image may be divided into a small number of relatively uniform regions. Each region (or sub-image) can then be assigned a single threshold using the techniques described above.

For applications in conditions of low ambient IR light (e.g., an indoor kiosk), the threshold-based classification described above is sufficient to discard almost all spurious candidate touch locations. However, when there is a high amount of ambient IR light, or in conditions of dynamic ambient lighting (e.g., an automotive console), the threshold-based classification may be insufficient to eliminate some spurious candidate touch locations.

Accordingly, in some embodiments, the classification component 208 performs a further classification on the candidate touch locations validated by the threshold-based classification to better compensate for such lighting conditions. More specifically, the classification component 208 classifies the remaining candidate touch locations using a machine learning classifier that classifies each candidate touch location as a valid or invalid touch location based on a combination of characteristics (features) of the candidate touch location. In some such embodiments, the machine learning classifier is used when high ambient IR light is detected by an ambient light sensor. Alternatively, in some such embodiments, the machine learning classifier is always used.

The features of a candidate touch location that may be considered by the machine learning classifier include a filter response value, the size of the candidate touch region, the shape of the candidate touch region, and the texture of a local neighborhood around the candidate touch point. The filter response value r of a candidate touch location (x,y) is the value of the filter when applied by the filter component 216 at the touch location in the filtered image, $r=I_f(x,y)$. The size a of the candidate touch region associated with a candidate touch location is determined by applying a threshold to the filtered image defined as an empirically determined fraction of the filter response r, i.e., a binary image is generated by evaluating $I_f > r*C$, where $0<C<1$ (for, e.g., C=0.75). The size (in pixels) is the number of "on" pixels in the resulting binary image that are connected to the candidate touch location.

The shape s of the touch region associated with a candidate touch location is also computed from this binary image, i.e., a descriptor of the shape formed by the "on" pixels connected to the candidate touch location is computed. Any suitable shape descriptor may be used, e.g., compactness, elongation, rectangularity, etc. In one embodiment, the shape descriptor is eccentricity, which is a measure of the elongation of a shape. Eccentricity is a measure of how elongated a shape is and is determined as the ratio of the major axis to the length of the minor axis of the best fitting ellipse of the shape. Any suitable technique for determining eccentricity may be used that results in a number between 0 and 1 depending on whether the shape is a line or a perfect circle.

The texture t of a candidate touch location is the texture of a local region (neighborhood) centered on the touch location. Texture descriptors capture the structure and/or contrast of the pixel intensities within the prescribed region. Any suitable texture descriptor technique may be used. Depending on the descriptor technique used, the size of the texture descriptor may vary. In some embodiments, the texture descriptor used is based on the local binary pattern described in T. Ojala, et al., "Multiresolution Gray-Scale and Rotation Invariant Texture Classification with Local Binary Patterns", IEEE Transactions on Pattern Analysis and Machine Intelligence, Vol. 24, No. 7, July 2002, pp. 971-987 ("Ojala"). This texture descriptor is referred to as the local difference pattern (LDP) herein.

The LDP texture descriptor computes the relative strength of a center pixel, e.g., a candidate touch location, against neighboring pixels. The neighborhood of a candidate touch location is sampled along a circle of radius d centered on the candidate touch location. The number of points sampled along the circumference is determined by the angular quantization parameter, θ. For example, if θ=45, there will be 8 (360/45) points sampled from the neighborhood given by the coordinate offsets [d*cos(θ*i), d*sin(θ*i)], for 0≤I<8, centered around the candidate touch location. Depending on the values of d and θ, some of the sampled coordinate locations may not lie on integer pixel coordinates. In this case, the intensity value at the sampled coordinates may be estimated by interpolating between neighboring pixel values, or, the coordinates may be rounded to the nearest integer location. In some embodiments, θ=45, and d is set to the scale of the filter which produced the highest filter response at that particular candidate touch point. Typically, smaller values of θ result in more samples, and the value is set based on empirical evaluation.

The LDP for a candidate touch location is an array of N values, where N is the number of pixels in the neighborhood set. The value of LDP(n) may be computed as $$LDP(n)=I_2(x, y)-I_2(x_n, y_n)$$

where $(x_n, y_n)$ is the location of the nth pixel of the N pixels in the neighborhood set. The order in which the N LDP values are stored is important. For an N element array, there are N possible orderings created by applying a circular shift to the elements of the array. In order to ensure that the LDP is invariant to rotation, all the N possible LDP orderings are evaluated against a specific criterion, and the best ordering is selected. For each ordering, $$Q = \sum_{i=1}^{N-1} LDP_{i+1} - LDP_i$$

Is evaluated, and the ordering for the LDP which results in the smallest value of Q is selected.

In some embodiments, the values of LDP(n) are normalized by the intensity of the candidate touch location, i.e., $LDP(n)=LDP(n)/I_2(x,y)$. In some embodiments, the LDP is quantized into a fixed set of coarser levels to compensate for potential small changes in pixel intensity variations. Note that depending on the radius and angular quantization of the neighborhood, the size, N, of the LDP can vary. Further, in some embodiment, two or more concentric rings of LDP may be computed at different distances from a candidate touch location. Assuming a fixed θ, each N element LDP is ordered based on the criterion described previously. The individual LDPs are then concatenated to form the final texture descriptor.

The classification component 202 may use any suitable machine learning classifier, such as, for example, a neural network or a support vector machine. The machine learning classifier is trained to discriminate between true (valid) touch locations and false (invalid) touch locations using some combination of r, a, s, and t. The particular combination of r, a, s, and t used for classification is an implementation choice. For example, assume the input to the machine learning classifier is a feature vector D. In some embodiments, D=[r a s t], i.e., the input to machine learning classifier for each candidate touch location includes values for all four of the above features. In other embodiments, D is a subset of the four features, e.g., [r a t], [r a s], [a s t], [s t], etc. Given an input feature vector D for a candidate touch location, the output of the machine learning classifier is a value indicating whether or not the candidate touch location is valid.

The pruning component 210 applies further criteria to the set of validated candidate touch locations identified by the candidate touch location identification component 206 to remove any false positives that may present. There are several possible causes of false positives in the validated candidate touch locations. For example, although a user touches a screen with only one finger, the user's other finger tips or knuckles are naturally quite close to the screen. The proximity of these other parts of the hand to the screen can result in a high response to the convolution kernel used by the filter component 216 which may be erroneously validated by the machine learning classifier and thus produce false positives. False positives can also be caused by noise in the IR sensor, non-uniform lighting of the screen surface, and specularities in the reflected IR light field.

In some embodiments, the pruning component 210 compares each validated candidate touch location against the highly saturated pixels, if any, identified by the saturated pixel detection component 202. If a validated candidate touch location is one of the highly saturated pixels, the candidate touch location is pruned from the set of validated candidate touch locations.

In some embodiments, in addition to the above pruning, the pruning component 210 applies further criteria to eliminate false positives caused by the proximity of a user's hand to the display surface. More specifically, the additional pruning is performed in embodiments in which the background modeling component generates a list F of foreground pixels in an image. In such embodiments, each validated candidate touch location is first compared against the list of foreground pixels F. If a validated candidate touch location is not in this list, the candidate touch location is pruned from the set of validated candidate touch locations.

Each validated candidate touch location that has passed the above pruning is then checked to verify that the candidate touch location is no further than a maximum distance, D, from the boundary of the blob formed by the foreground pixels, F. Any suitable technique may be used to compute the distance of a candidate touch location from the boundary. In some embodiments, the distance is computed as follows. Initially, all the coordinates in the foreground pixel list, F, are set to 1 in an otherwise black image (all pixels set to 0). Then, the distance transform of this image is computed. The distance transform assigns to each pixel the distance to the nearest 0 valued pixel. The distance transform value of a candidate touch location (x,y) is read from this image, and compared against a threshold D. The threshold D is set empirically, and typically corresponds to the length of the major axis of the ellipse that fits the largest expected touch shape.

The touch tracking component 212 tracks detected touch locations over time. In general, the touch tracking component 212 associates each touch location output by the pruning component 210 with a unique identifier (or label). At any time t, the touch tracking component 212 maintains a set of valid (or active) touch locations each of which are associated with a unique label. At time t+1, the touch detection process localizes a new set of one or more touch locations. The touch tracking component 212 then searches for correspondences between the existing valid touch locations from time t and the touch locations detected at t+1. Where correspondences are found, labels from time t are propagated to the corresponding new touch locations at t+1. If no correspondence is found, a new label is assigned to the touch location at t+1. With the help of the touch tracking component 212, the final output at each frame is a triple of the form {x,y,label} for each touch location present in the frame.

The tracking algorithm of the touch tracking component 212 employs a Kalman filter, also referred to as linear quadratic estimation, to model the dynamics of the touch motion and Munkres' assignment algorithm to determine frame-to-frame correspondences. Munkres' assignment algorithm is described in J. Munkres, "Algorithms for the Assignment and Transportation Problems," Journal of the Society for Industrial and Applied Mathematics, Vol. 5, No. 1, pp. 32-38, March, 1957. A touch location is represented as a 2D location and has an associated Kalman filter. The state vector S of the filter is of dimension 4×1, S={x, y, vx, vy}, where vx and vy are the x and y components of the velocity and the measurement (or observation) vector M is 2×1, M={x,y}.

The touch tracking component 212 uses Kalman filter prediction to compute the expected location of all touch locations from frame t−1 (denoted by $P_{t-1}$). The touch detection components generate new touch locations for frame t (denoted by $P_t$). Assume that each of the touch locations from frame t−1 has an associated label, while the touch locations indentified in frame t are not labelled. Let $\|Pt_{t-1}\|$ be N, and $\|P_t\|$ be M. A N×M distance matrix D is computed such that D(i,j) is the Euclidean distance between the ith location in $P_{t-1}$ and the jth location in $P_t$. The matrix D serves as the cost matrix for Munkres' assignment algorithm. Thus the cost of assigning location i to j is proportional to the distance between the two locations. Before using D in the assignment algorithm, D is modified by setting all values of D greater than a threshold to infinity. This threshold captures the maximum expected displacement of a touch movement between t−1 and t. Setting all values of D greater than this threshold to infinity ensures that no valid solution of the assignment problem produces a result where two locations separated by a distance greater than the threshold are matched together. Upon execution of Munkres algorithm, the touch tracking component 212 has determined the optimal assignment of locations from $P_{t-1}$ to $P_t$ based on D.

Since N is not equal to M, not all touch locations between $P_{t-1}$ and $P_t$ will have valid assignments. The labels for the touch locations from $P_{t-1}$ that do have a valid assignment are carried over from frame t−1 to the corresponding touch locations at frame t. The Kalman filter measurement vectors for these touch locations are also updated with the coordinates of the matched locations from $P_t$. Then, the touch tracking component 212 performs the Kalman filter update (or correction) step that reconciles the predicted state of the Kalman filter for each touch location with the new measurement coordinates and produces a corrected estimate of the location. The touch tracking component 212 then updates the final position of the tracked locations with the corrected estimates.

For the touch locations from $P_{t-1}$ that do not have an assignment, the touch tracking component 212 updates the position of each of these locations based on the Kalman filter prediction step. The lack of an assignment could be due to a number of reasons such as noise or occlusions, that last only a few frames. The touch tracking component 212 will update a touch location without an assignment for a predetermined number of consecutive frames before the touch location is deleted. Allowing a touch location without an assignment to update for a few frames permits the system to recover from transitory detection failures. The number of consecutive frames is a tuning parameter that may be set to accommodate expected or known behavior.

For the touch locations from $P_t$ that do not get an assignment from Munkres' algorithm, the touch tracking component 212 creates new labels and initializes new Kalman filters for the touch locations. These touch locations are treated as new touch locations that are not associated with any currently tracked touch locations.

Figure 4:
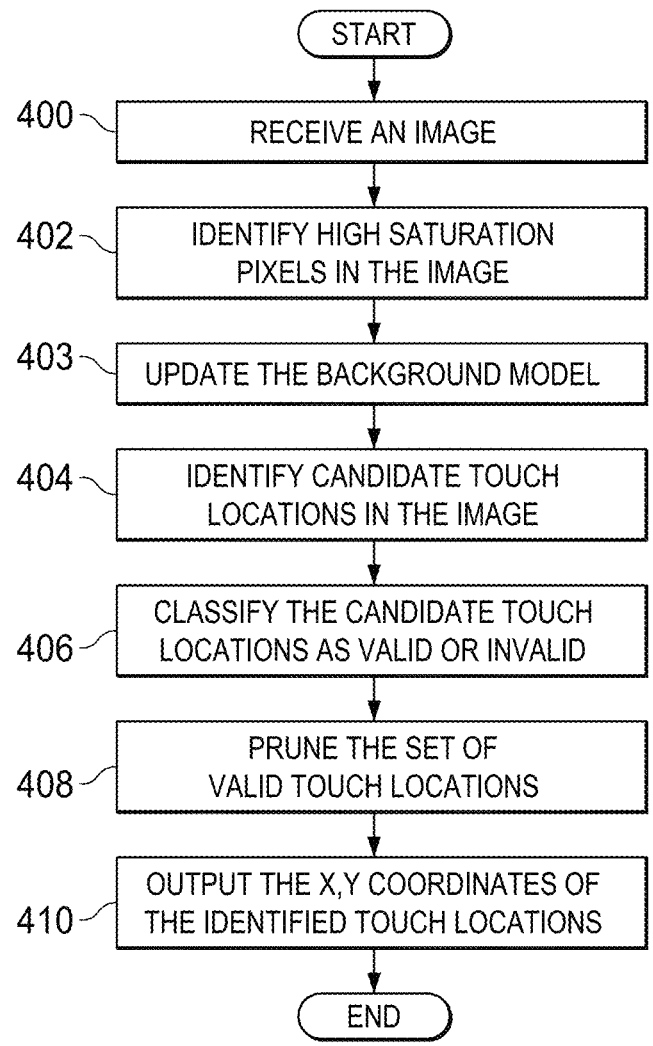
FIG. 4 is a flow diagram of a method for touch detection in an optical touch detection system.

FIG. 4 is a flow diagram of a method for touch detection that may be executed in an optical touch detection system. The method may be executed on each frame (image) of a video stream captured by a camera positioned to capture light reflections caused by objects approaching and/or touching the surface of a screen in the optical touch detection system. Note that the frames may be pre-processed prior to the application of the method. Such pre-processing may include, for example, image smoothing, de-noising, combining pairs of images, etc.

Referring to FIG. 4, initially an image of the video stream is received 400. High saturation pixels are then identified 402 in the image. Techniques that may be used for identification of high saturation pixels are previously described herein in reference to the saturated pixel detection component 202 of FIG. 2. The background model is also updated 403 based on the input image. Techniques that may be used to generate and maintain a suitable background model are previously described herein in reference to the background modeling component 204 of FIG. 2.

Initial candidate touch locations are also identified 404 in the image. Techniques that may be used to identify initial candidate touch locations are previously described herein in reference to the candidate touch location identification component 206 of FIG. 2. Note that the initial candidate touch locations may be identified from a mean-subtracted image generated by subtracting the background (mean) image from the input image.

The set of initial candidate touch locations is then classified 406 to identify a set of valid candidate touch locations from the initial set of candidate touch locations. Techniques that may be used for classification of the initial candidate touch locations are previously described herein in reference to the classification component 208 of FIG. 2. The set of validated candidate touch locations is then purned 408 to remove any false positives and generate the final set of touch locations. Techniques that may be used for pruning of the set of validated candidate touch locations are previously described herein in reference to the pruning component 210 of FIG. 2. The x,y coordinates of the touch locations in the final set are then output 410 for use in further processing, e.g., for touch tracking as described herein and/or for processing in an application associated with a touch location in the final set.

Figure 5A:
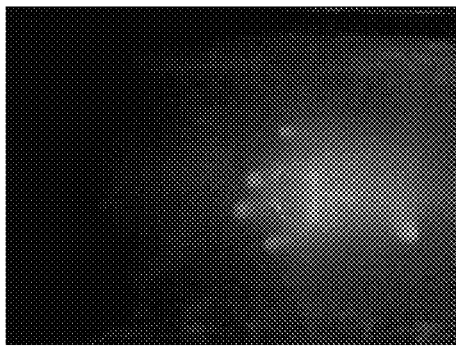
FIGS. 5A-5F are an example.
Figure 5B:
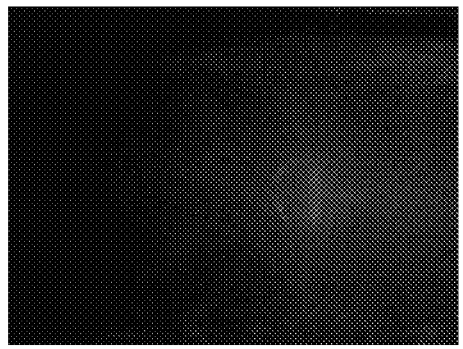
Figure 5C:
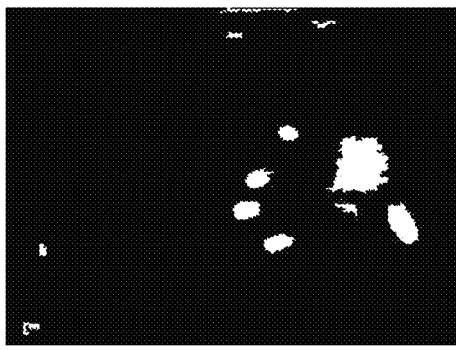
Figure 5D:
Figure 5E:
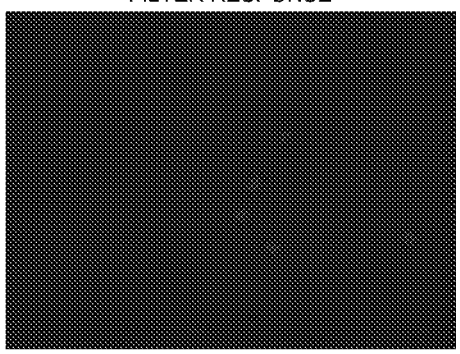
Figure 5F:
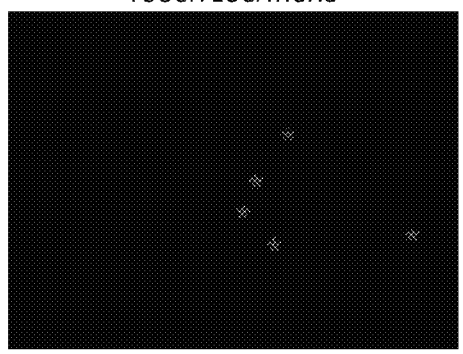

FIGS. 5A-5F are an example illustrating the state of an image at various points during the touch detection processing as described herein. All five fingers of hand are touching the surface of a screen in an optical touch detection system implementing an embodiment of the method of FIG. 4. FIG. 5A shows an example input image. Note the various intensities of the light reflections causes by the fingers and palm of the hand. FIG. 5B shows the mean (background) image. FIG. 5C shows the binary foreground image computed during the process of estimating the background mean image using the previously described single Gaussian approach. FIG. 5D shows the mean-subtracted image used for candidation touch location identification. FIG. 5E shows the filtered image and FIG. 5F shows the final identified touch locations.

Other Embodiments

While the invention has been described with respect to a limited number of embodiments, those skilled in the art, having benefit of this disclosure, will appreciate that other embodiments can be devised which do not depart from the scope of the invention as disclosed herein.

For example, embodiments are described herein in which IR LEDs provide the light source and an IR camera is used to capture the images. One of ordinary skill in the art will understand embodiments in which the light source produces light in other than the IR band and the corresponding imaging sensor is tuned to this light. As is well known, there are two main criteria for choosing a suitable light source: 1) the light should be within a narrow band in the electro-magnetic spectrum so that the sensor (camera) can be tuned to detect only that specific band of light energy, and 2) if visible light is projected on the screen, for, e.g., a visible user interface, the light used for touch detection should be distinct from the visible light spectrum so that the projected RGB video does not interfere with the touch detection process.

In another example, embodiments are described herein in which the light source, camera, and projector are positioned behind the touch surface. One of ordinary skill in the art will understand embodiments in which the light source, camera, and projector are suitably positioned in front of the touch surface and/or behind the touch surface. For example, the projector may be positioned in front of the touch screen while the camera and IR light source are placed behind the screen.

In another example, embodiments are described herein in which a projector is used to project a user interface on a display screen. One of ordinary skill in the art will understand embodiments in which a projector is not used. For example, in some low-cost touch systems with fixed functionality, the user interface may be directly "painted" onto the display screen and does not change. When a user touches one of the "buttons" on the display screen, the touch location may be determined from an image as described herein and an application may be triggered responsive to the identified touch location to, e.g., deliver a selected product or to capture a photograph or to increase a temperature or to generate a sound, or to issue a ticket or to dim a light or to summon a waiter, etc.

In another example, embodiments are described herein in which non-maximum suppression is used to identify local maxima in a filtered image, the local maxima forming the initial set of candidate touch locations. One of ordinary skill in the art will understand embodiments in which local minima are identified using non-minima suppression instead of indentifying local maxima, the local minima forming the initial set of candidate touch locations. Local minima and local maxima may be referred to as local extrema.

Embodiments of the methods, the application processor 112, and the touch processor 110 of FIG. 1, and the components of the touch processor 110 described herein may be implemented in hardware, software, firmware, or any suitable combination thereof, such as, for example, one or more digital signal processors (DSPs), microprocessors, discrete logic, application specific integrated circuits (ASICs), field-programmable gate arrays (FPGAs), etc. The application processor 112 and the touch processor 110 may be separate processors or may be implemented as a single system on a chip (SoC) such as an Open Multimedia Application Platform (OMAP) SoC available from Texas Instruments, Inc. Any software instructions may be initially stored in a computer-readable medium and loaded and executed in a processor. In some cases, the software instructions may also be sold in a computer program product, which includes the computer-readable medium and packaging materials for the computer-readable medium. In some cases, the software instructions may be distributed via removable computer readable media, via a transmission path from computer readable media on another digital system, etc. Examples of computer-readable media include non-writable storage media such as read-only memory devices, writable storage media such as disks, flash memory, memory, or a combination thereof.

Although method steps may be presented and described herein in a sequential fashion, one or more of the steps shown in the figures and described herein may be performed concurrently, may be combined, and/or may be performed in a different order than the order shown in the figures and/or described herein. Accordingly, embodiments should not be considered limited to the specific ordering of steps shown in the figures and/or described herein.

It is therefore contemplated that the appended claims will cover any such modifications of the embodiments as fall within the true scope of the invention.

What is claimed is:

1. A method for touch detection performed by a touch processor in an optical touch detection system, the method comprising:
    receiving an image of an illuminated surface comprised in the optical touch detection system, wherein the image is captured by a camera comprised in the optical touch detection system;
    identifying a set of candidate touch locations in the image, wherein identifying a set of candidate touch locations comprises subtracting a background model from the image to generate a mean-subtracted image, filtering the mean-subtracted image with a filter having zero mean with coefficients of a same sign in a center of the filter surrounded by coefficients of an opposite sign such that a size of a central region corresponds to an expected size of a finger touch, and identifying local extrema in the filtered mean-subtracted image;
    classifying the candidate touch locations in the set of candidate touch locations to generate a set of validated candidate touch locations, wherein classifying the candidate touch locations comprises using a machine learning classifier to classify each candidate touch location as valid or invalid, wherein the machine learning classifier is trained to classify a candidate touch location based on a combination of features of the candidate touch location; and
    outputting a set of final touch locations.

2. The method of claim 1, further comprising:
    identifying highly saturated pixels in the image, and
    pruning the set of validated candidate touch locations to generate the set of final touch locations, wherein pruning the set of validated candidate touch locations comprises pruning the set of validated candidate touch locations based on the identified highly saturated pixels, wherein a validated candidate touch location is not included in the set of final touch locations if the validated candidate touch location corresponds to a highly saturated pixel.

3. The method of claim 2, wherein identifying highly saturated pixels comprises comparing each pixel in the image to a predetermined high saturation threshold and identifying pixels above the high saturation threshold as highly saturated pixels.

4. The method of claim 2, wherein pruning the set of validated candidate touch locations further comprises:
    removing a validated candidate touch location from the set of validated candidate touch locations when the validated candidate touch location is not in a set of foreground pixels in the image; and
    removing a validated candidate touch location from the set of validated candidate touch locations when the validated candidate touch location is outside a maximum distance from a boundary of a blob formed by the foreground pixels.

5. The method of claim 1, wherein the combination of features comprises at least one feature selected from a group of features consisting of a filter response value of the candidate touch location, a size of a touch region corresponding the candidate touch location, a shape of the touch region corresponding of the candidate touch location, and a texture of a neighborhood of pixels around the candidate touch location.

6. The method of claim 1, wherein the combination of features consists of a filter response value of the candidate touch location, a size of a touch region corresponding the candidate touch location, a shape of the touch region corresponding of the candidate touch location, and a texture of a neighborhood of pixels around the candidate touch location.

7. The method of claim 1, wherein classifying the candidate touch locations comprises comparing each pixel to a predetermined detection threshold.

8. The method of claim 1, wherein classifying the candidate touch locations comprises comparing each pixel to a predetermined detection threshold, the predetermined pixel threshold corresponding to a location of the pixel, wherein a predetermined detection threshold for a first pixel location is different from a predetermined detection threshold for a second pixel location.

9. The method of claim 1, wherein the camera is an infrared camera.

10. The method of claim 1, further comprising:
    tracking the final touch locations, wherein tracking comprises:
    using Kalman filter prediction to compute an expected location of each touch location from a previous image; and
    using Munkres' assignment algorithm to determine which touch locations of the final touch locations correspond to touch locations from the previous image.

11. An optical touch detection system configured for touch detection, the system comprising:
    an illuminated surface;
    a camera positioned to capture images of the illuminated surface;
    a processor coupled to the camera for executing a method, the method comprises:
    receiving an image of the illuminated surface captured by the camera;
    identifying a set of candidate touch locations in the image, wherein identifying a set of candidate touch locations comprises subtracting a background model from the image to generate a mean-subtracted image, filtering the mean-subtracted image with a filter having zero mean with coefficients of a same sign in a center of the filter surrounded by coefficients of an opposite sign such that a size of a central region corresponds to an expected size of a finger touch, and identifying local extrema in the filtered mean-subtracted image;
    classifying the candidate touch locations in the set of candidate touch locations to generate a set of validated candidate touch locations, wherein classifying the candidate touch locations comprises using a machine learning classifier to classify each candidate touch location as valid or invalid, wherein the machine learning classifier is trained to classify a candidate touch location based on a combination of features of the candidate touch location; and
    outputting a set of final touch locations.

12. The optical touch detection system of claim 11, further comprising:
    identifying highly saturated pixels in the image, and pruning the set of validated candidate touch locations to generate the set of final touch locations, wherein pruning the set of validated candidate touch locations comprises pruning the set of validated candidate touch locations based on the identified highly saturated pixels, wherein a validated candidate touch location is not included in the set of final touch locations if the validated candidate touch location corresponds to a highly saturated pixel.

13. The optical touch detection system of claim 12, wherein identifying highly saturated pixels compares each pixel in the image to a predetermined high saturation threshold and identifying pixels above the high saturation threshold as highly saturated pixels.

14. The optical touch detection system of claim 11, wherein the combination of features comprises at least one feature selected from a group of features consisting of a filter response value of the candidate touch location, a size of a touch region corresponding the candidate touch location, a shape of the touch region corresponding of the candidate touch location, and a texture of a neighborhood of pixels around the candidate touch location.

15. The optical touch detection system of claim 11, wherein the combination of features consists of a filter response value of the candidate touch location, a size of a touch region corresponding the candidate touch location, a shape of the touch region corresponding of the candidate touch location, and a texture of a neighborhood of pixels around the candidate touch location.

16. The optical touch detection system of claim 11, wherein classifying the candidate touch locations comprises comparing each pixel to a predetermined detection threshold, the predetermined pixel threshold corresponding to a location of the pixel, wherein a predetermined detection threshold for a first pixel location is different from a predetermined detection threshold for a second pixel location.

17. The optical touch detection system of claim 11, wherein the camera is an infrared camera.

18. A non-transitory computer readable medium storing software instructions that, when executed by a touch processor comprised in an optical touch detection system, causes the optical touch detection system to perform a method for touch detection, the method comprising:
receiving an image of an illuminated surface comprised in the optical touch etection system, wherein the image is captured by a camera comprised in the optical touch detection system;
identifying a set of candidate touch locations in the image, wherein identifying a set of candidate touch locations comprises subtracting a background model from the image to generate a mean-subtracted image, filtering the mean-subtracted image with a filter having zero mean with coefficients of a same sign in a center of the filter surrounded by coefficients of an opposite sign such that a size of a central region corresponds to an expected size of a finger touch, and identifying local extrema in the filtered mean-subtracted image;
classifying the candidate touch locations in the set of candidate touch locations to generate a set of validated candidate touch locations, wherein classifying the candidate touch locations comprises using a machine learning classifier to classify each candidate touch location as valid or invalid, wherein the machine learning classifier is trained to classify a candidate touch location based on a combination of features of the candidate touch location; and
outputting a set of final touch locations.

* * * * *